(12) United States Patent
Schmidt

(10) Patent No.: US 6,994,373 B2
(45) Date of Patent: Feb. 7, 2006

(54) CONNECTION BETWEEN AN INNER CASING TUBE OF A STEERING COLUMN OF A MOTOR VEHICLE AND A HOLDER

(75) Inventor: Joachim Schmidt, Grosshansdorf (DE)

(73) Assignee: DaimlerChrysler AG, Stuttgart (DE)

( * ) Notice: Subject to any disclaimer, the term of this patent is extended or adjusted under 35 U.S.C. 154(b) by 27 days.

(21) Appl. No.: 10/264,412

(22) Filed: Oct. 4, 2002

(65) Prior Publication Data

US 2003/0085561 A1    May 8, 2003

(30) Foreign Application Priority Data

Oct. 12, 2001 (DE) ................................. 101 50 616

(51) Int. Cl.
*B62D 1/16* (2006.01)
(52) U.S. Cl. .................... 280/779; 29/512; 74/492; 403/277; 403/348
(58) Field of Classification Search ............... 280/775, 280/779; 74/492, 493; 29/512, 523; 403/348, 403/274, 277
See application file for complete search history.

(56) References Cited

U.S. PATENT DOCUMENTS 3,497,946 A * 3/1970 Tingley Jr. .................. 29/512
3,724,286 A * 4/1973 Kitzner et al. ................ 74/492
3,778,090 A * 12/1973 Tobin ........................... 29/523
3,787,945 A * 1/1974 Pasek et al. .................. 29/523

FOREIGN PATENT DOCUMENTS

| BG | 2123927 A | * | 2/1984 |
| DE | 694 02 768 T2 | | 7/1997 |
| DE | 198 12 172 C1 | | 7/1999 |
| WO | WO 200102738 A1 | * | 1/2001 |

* cited by examiner

*Primary Examiner*—Eric Culbreth
(74) *Attorney, Agent, or Firm*—Kenyon & Kenyon

(57) ABSTRACT

In a connection between an inner casing tube of a steering column of a motor vehicle and a sleeve-shaped holder, an adjusting device for the casing tube is fastened and engages around the casing tube in an encircling manner and is fixed thereon in a form-fitting manner. In order to hold the holder on the casing tube in a secure and positionally correct manner counter to high axial forces and torques using the simplest arrangement possible, the casing tube has at least two axially spaced apart, radially protruding stops against which, on a mutually facing side, the holder bears with a respective stop edge, and the casing tube has at least one form-fitting element which interacts in a latching manner in the circumferential direction with a mating form-fitting element arranged on the holder.

25 Claims, 4 Drawing Sheets

CONNECTION BETWEEN AN INNER CASING TUBE OF A STEERING COLUMN OF A MOTOR VEHICLE AND A HOLDER

CROSS-REFERENCE TO RELATED APPLICATIONS

The present application claims priority to Application No. 101 50 616.3, filed in the Federal Republic of Germany on Oct. 12, 2001, which is expressly incorporated herein in its entirety by reference thereto.

FIELD OF THE INVENTION

The present invention relates to a connection between an inner casing tube of a steering column of a motor vehicle and a holder and to a method for its production.

BACKGROUND INFORMATION

A connection and a method for its production are described in German Published Patent Application No. 198 12 172 in which the sleeve-shaped holder is first of all pushed onto the casing tube and is subsequently pressed onto two half shells which form a ring arrangement and are positioned in an encircling bead formed on the casing tube. For positioning purposes, the half shells have a thickened profile section in the form of a radially inwardly protruding bulge. The pushing-on process takes place until an oblique shoulder formed on the inside of the holder comes to bear against the bulge. In the press-on direction, the shoulder of the holder bears axially in a form-fitting manner against the bulge of the half shells. In order to achieve a form-fitting connection counter to the press-on direction in addition to the press fit which is obtained, a plurality of caulked lugs distributed over the inner circumference of the holder are arranged at that end of the holder which is opposite the shoulder, the caulked lugs being caulked to the half shells. By the press fit which is obtained, minimum ejection forces of >15 kN should be able to be absorbed. Furthermore, a high torque of at least 25 Nm should be able to be absorbed in a slip-free manner by the frictional connection which is obtained.

However, it has been established in practice that the conventional solution is not readily sufficient in order to counteract the forces and the torque at this magnitude without any problems. The holder is therefore additionally fastened to the casing tube by a pinned fitting. The conventional connection between the casing tube and the holder therefore requires a number of individual parts by which the half shells have to be held in position in a very elaborate manner during the installation of the holder on the casing tube.

Furthermore, German Published Patent Application No. 694 02 768 describes a steering-column housing of a motor vehicle, on which a flange for the connection to the rest of the structure of the motor vehicle is arranged. The flange has a collar which surrounds the steering-column housing and is fastened to the outside of the housing between radial deformations with the aid of a crimp connection. In order to secure the flange against rotation, the latter has a protruding part which engages in a recess of the steering-column housing.

It is an object of the present invention to provide a connection in which a holder is held on the casing tube in a secure and positionally correct manner counter to high axial forces and torques using the simplest arrangement possible.

Furthermore, it is an object of the present invention to provide a method for producing the connection, the method enabling the holder to be installed on the casing tube with only little complexity.

SUMMARY

The above and other beneficial objects of the present invention are achieved by providing a connection and a method as described herein.

The present invention enables the half shells which are customary in the prior art and a pinned fitting to be omitted. Due to the locking obtained in the axial direction and circumferential direction, the holder is held in a defined position on the casing tube without separate connecting parts. The frictional connection between the holder and casing tube for compensating for axial forces of 15 kN and more and/or torques of 25 Nm and more being applied is only of secondary importance. Rather, the forces and torques are absorbed to a sufficient extent by the form-fitting connection which is achieved, so that the holder remains mounted in a secure and positionally correct manner on the casing tube. The complexity for producing the connection is extremely low. Since no connecting parts are used, the installation is very simple, the holder having to be held in its axial position on the casing tube only until the rear stop is formed.

In an exemplary embodiment of the present invention, a connection includes: an inner casing tube of a steering column of a motor vehicle; a sleeve-shaped holder configured to be fastened to an adjusting device for the casing tube, the holder engaging around the casing tube in an encircling manner and fixed on the casing tube in a form-fitting manner; and wherein the casing tube includes at least two axially spaced apart, radially protruding stops against which, on oppositely facing sides, the holder is configured to directly bear with respective stop edges, the casing tube including at least one form-fitting element configured to interact in a latching manner in a circumferential direction with a mating form-fitting element arranged on the holder, one of the stops of the casing tube including a stepped concentric widening of the casing tube.

In an exemplary embodiment the present invention, a method for producing a connection between an inner casing tube of a steering column of a motor vehicle and a sleeve-shaped holder to which an adjusting device for the casing tube is fastened, includes the steps of pushing the holder onto the casing tube; forming a radially protruding front stop on the casing tube the holder then pushed on until it bears against the front stop on the casing tube; forming at least one form-fitting element on the casing tube; forming a mating form-fitting element on the holder; latching together the mating form-fitting element of the holder with the form-fitting element of the casing by movement of the casing tube relative to the holder in a circumferential direction; and forming a rear stop on the casing tube so that the holder is enclosed between the front stop and the rear stop.

The at least one form-fitting element may include a plurality of form-fitting elements formed on the casing tube and the holder includes a corresponding plurality of mating form-fitting elements distributed irregularly in the circumferential direction.

The at least one form-fitting element may include a plurality of form fitting elements formed on the casing tube, and the holder may include a corresponding plurality of mating form-fitting elements, the form-filling elements offset with respect to one another in the circumferential direction and in an axial direction.

The front stop may include an encircling annular collar, and the stops forming step may include the substep of forming the encircling annular collar from the casing tube by internal high pressure.

The front stop may include an annular collar, and the stops forming step may include the substep of upsetting the casing tube to form the annular collar.

The rear stop forming step may include the substep of concentrically expanding a section of the casing tube spaced apart from the front stop in a stepped manner by internal high pressure.

The rear stop forming step may include the substep of concentrically expanding a section of the casing tube spaced apart from the front stop in a stepped manner by one of tumbling and indenting.

The concentrically expanding substep may include the further substep of pressing the holder against the front stop.

The concentrically expanding substep may include the further substep of pressing the holder against the front stop.

The form-fitting element forming step may include the substep of forming the knob by internal high pressure.

The form-filling element forming step may include the substep of forming the knob by a tool pushed into the casing tube and used with a punch to press a wall radially outwardly locally.

The holder may be cast, and the mating form-fitting element forming step may include the substep of casting the one of the depression and the latching groove at a same time as casting the holder.

The mating form-fitting element forming step may include the substep of embossing the one of the depression and the latching groove in the holder.

The mating form-fitting element forming step may include the substep of milling the one of the depression and the latching groove out of the holder.

The method may include the step of one of casting and turning a concentric, stepped widening of a passage opening of the holder in a region of an end side arranged in a push-on direction, the holder pushed onto the casing tube until a stepped offset of the widening bears against a stop of the casing tube which is arranged in the push-on direction.

The method may include the step of forming at least one lug that protrudes radially outwardly and obliquely counter to a push-on direction on the casing tube in a region of the front stop of the casing tube by an embossing tool placed into the casing tube, the form-fitting element including the lug, penetration of the lug into the holder during the pushing step causes formation of a depression, the depression including the form-fitting element.

DETAILED DESCRIPTION

Figure 1:
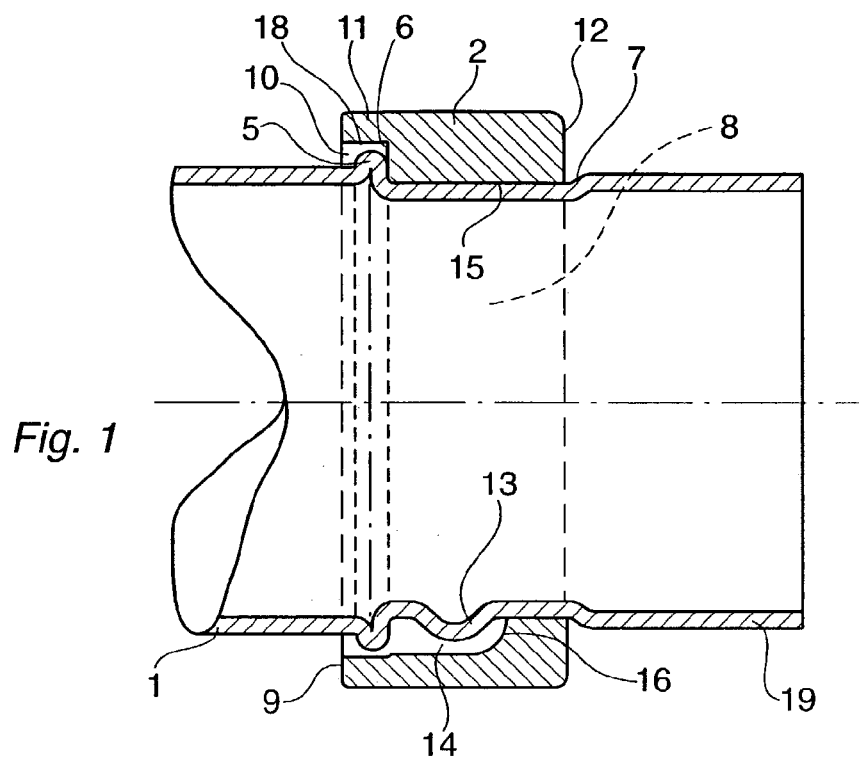
FIG. 1 illustrates, in a lateral longitudinal cross-sectional view, a casing tube of a steering column with a holder pushed on and fastened according to the present invention.
Figure 2:
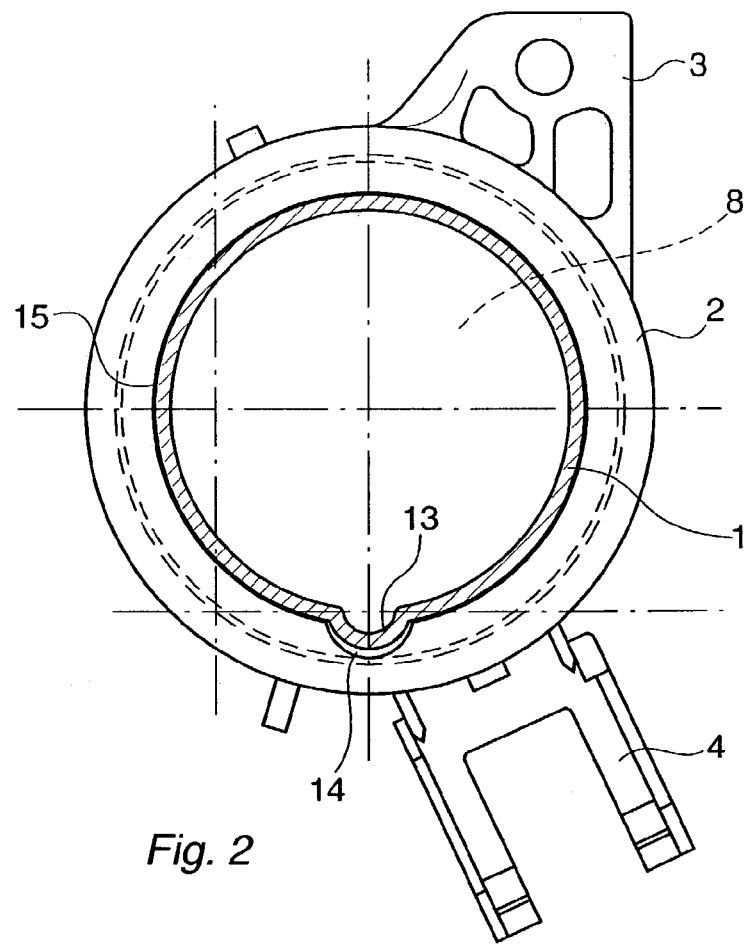
FIG. 2 illustrates, in a cross-sectional view, the casing tube illustrated in FIG. 1 connected to the holder.

FIG. 1 illustrates a connection between an inner casing tube 1 of the steering column of a motor vehicle and a sleeve-shaped holder 2 which is produced from a zinc diecasting. The inner casing tube 1 is mounted in an axially displaceable manner in an outer casing tube. In order to bring about the telescopic, axial displacement of the inner casing tube 1 relative to the outer casing tube, a spindle drive is provided as adjusting device, the spindle drive having an adjusting spindle which, at least in a subregion, is configured as a threaded spindle. The adjusting spindle is arranged in a manner such that it may move linearly parallel to the axis of the steering control shaft by a threaded nut mounted rotatably on the outer casing tube, a correspondingly suitable toothed gearing and an electric servomotor. One end of the adjusting spindle assigned to the inner casing tube 1 engages, by a corresponding square profile, in a rotationally fixed manner in a corresponding receiving profiling of a securing arrangement 3 (FIG. 2) which is connected integrally to the holder 2 and is fixed by the latter on the inner casing tube 1. The holder 2 transmits tensile and compressive movements of the adjusting spindle to the inner casing tube 1, so that the desired axial movements are achieved. In the push-on position, the holder 2 engages around the inner casing tube 1 in an encircling manner coaxially with respect to the steering control shaft. Furthermore, a plug socket 4 is integrally formed on the holder, in which socket a plug-in coupling of a switch module may be positioned in order to achieve a plug-in connection to a plug. The plug-in connection may ensure electronic or electrical data and signal transmission.

In order to bring about the connection according to the present invention, the casing tube 1 has a front, radially protruding stop 5 in the form of an encircling annular collar. The stop 5 may, in principle, also be represented by one or more radially protruding knobs distributed over the circumference. However, the annular collar may have the advantage that the holder 2 may bear with a front stop edge 6 against the stop 5 in a uniform manner stable against tilting. The holder 2 is fixed axially in a form-fitting manner on the casing tube 1 with the effect that it is enclosed by the front stop 5 and a rear, radially protruding stop 7 spaced apart axially from the front stop 5. The stop 7 is formed by a step of a stepped, concentric widening of the casing tube 1 on which that end side 12 of the holder 2 which faces the casing tube forms the stop edge. The passage opening 8 of the holder 2 is widened concentrically in a stepped manner in the region of its end side 9 arranged in the push-on direction, the stepped offset of the widening 10 forming the stop edge 6. The annular collar protrudes radially so that its outside diameter is smaller than the diameter of the widening 10. As a result, the annular collar comes to be within the holder 2 in a structural-space-saving manner and is covered to the outside by an end section 11 of the holder 2 of reduced wall thickness.

Figure 4:
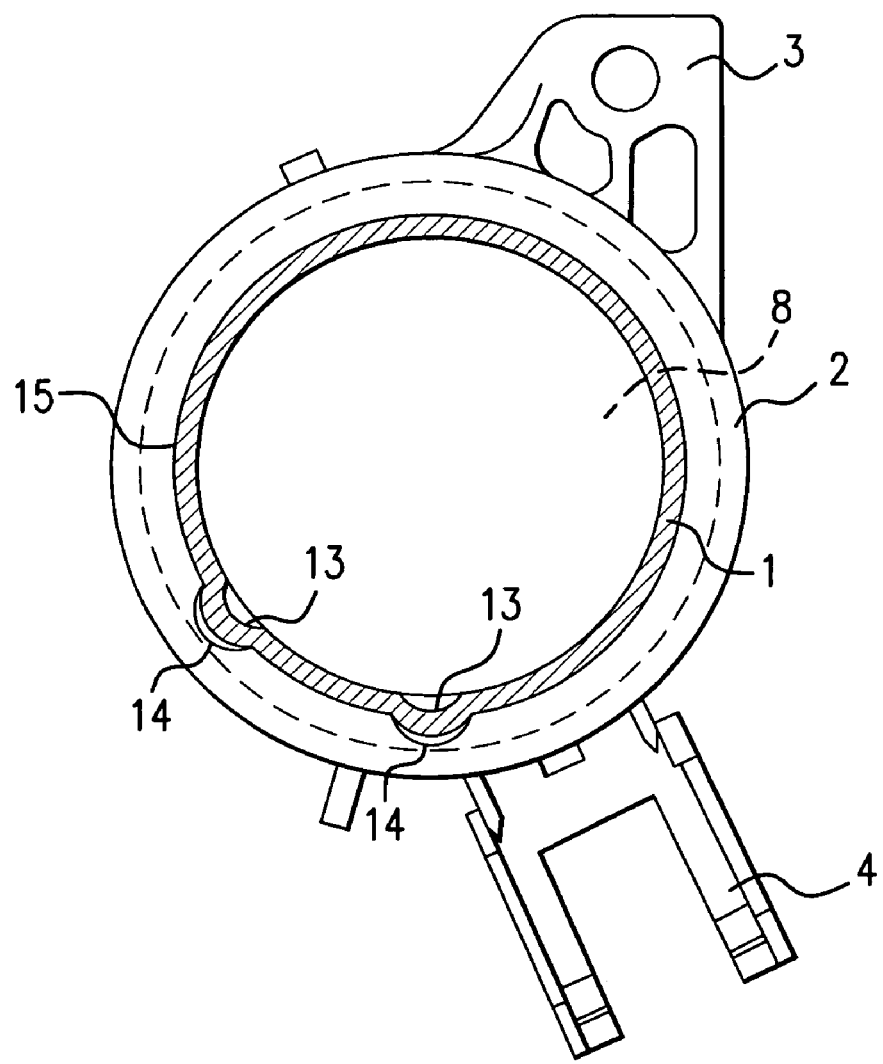
FIG. 4 schematically illustrates, in a cross-sectional view, a casing tube connected to the holder similar to that illustrated in FIG. 1 except with a plurality of form-fitting elements.

Furthermore, the casing tube 1 has on its circumference at least one form-fitting element in the manner of a dome-shaped knob 13 which interacts in a latching manner in the circumferential direction with a mating form-fitting element 14 arranged on the holder 2. As a result, the casing tube 1 also obtains a defined position in the circumferential direction relative to the holder 2, the position also being secured, due to the form-fitting connection, with respect to the application of relatively high forces. The mating form-fitting element 14 may, for example, be a depression which is negative in shape to the knob 13 and may be incorporated, e.g., milled, on the holder 2 or may be cast at the same time as the holder 2. The arrangement of the depression may enable latching of the knob 13 not only in the circumferential direction, but also in the axial direction, so that a form-fitting connection is similarly provided in the latter direction, which connection secures the holder 2 on the casing tube 1 with respect to axial displacements. However, the configuration of the knob 13 is intended to ensure sufficient elasticity, with the result that the pushing of the holder 2 onto the casing tube 1 takes place more easily. As an alternative to the depression, the mating form-fitting element 14 may—as illustrated in the present exemplary embodiment—be a latching groove which extends axially on the inside 15 of the holder 2 along the passage opening 8 and which emerges from that end side 9 of the holder 2 which is in the push-on direction. In the pushed-on position of the holder 2, the other end 16 of the latching groove is situated between the knob 13 and the opposite end side 12 of the holder 2. The configuration of the mating form-fitting element 14 as a latching groove may enable the holder 2 to be pushed onto the casing tube 1 without any problems and without particular demands having to be made of the configuration of the knob 13. The holder 2 may thus be threaded in a simple manner by the latching groove onto the knob 13 until the front axial stop 5 is reached. In order to increase the absorption of force in the circumferential direction and—in the case of the depression being formed—in the axial direction, a plurality of knobs 13 may be formed on the casing tube 1 and, correspondingly, a plurality of mating form-fitting elements 14 may be formed on the holder 2, as illustrated in FIG. 4. In order to provide a defined circumferential position of the holder 2 on the casing tube 1, care may be taken to distribute the knobs 13 or the depressions or latching grooves irregularly in the circumferential direction. As an alternative to this, this may also take place by an arrangement of form-fitting elements and mating form-fitting elements 14, in which the elements are offset with respect to one another in the circumferential direction, on the one hand, and in the axial direction, on the other hand. FIG. 4 illustrates, in a cross-sectional view, a casing tube 1 connected to the holder 2, similar to the casing tube 1 illustrated in FIG. 1, except with a plurality of circumferentially offset form-fitting elements 14.

Figure 3:
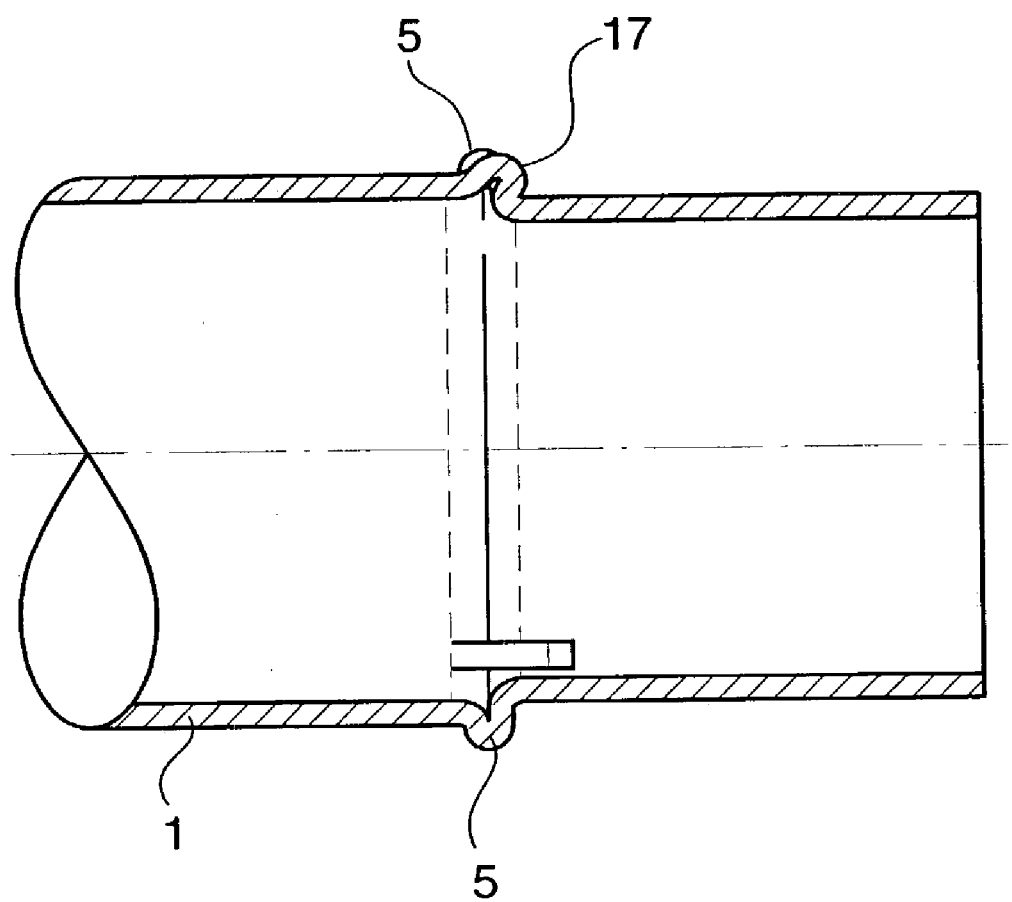
FIG. 3 illustrates, in a lateral longitudinal cross-sectional view, a casing tube of a steering column with an axial stop and form-fitting element according to the present invention.
Figure 5:
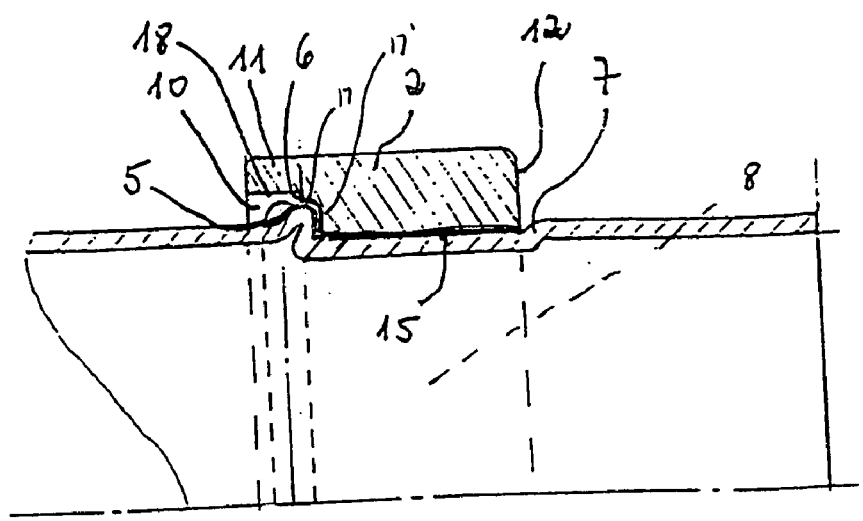
FIG. 5 schematically illustrates, in a lateral longitudinal cross-sectional view, a top half of the casing tube of FIG. 1 with an axial stop and a radially protruding lug, according to an exemplary embodiment of the present invention.

As illustrated in FIG. 3 and FIG. 5, it is also possible for the form-fitting element to be configured as a radially outwardly protruding lug 17 which points obliquely counter to the push-on direction of the holder 2. The lug 17 is formed from the casing tube 1, in the region of the front stop 5, by an embossing tool placed into the casing tube 1 or by internal high-pressure deformation. In FIG. 3, the lug 17 is part of the annular collar, as a result of which advantages in terms of the economy of the method may be obtained due to the production of the annular collar and the lug 17 in one working step. The lug 17 engages in a depression 17' of the holder 2, which depression is formed on the inside 18 of the widening 10. In this connection, it may be favorable for a tight interlocking of lug 17 and depression 17' and therefore for a particularly good locking of the form-fitting element in the circumferential direction if the depression 17' is only formed by the holder 2 being pushed onto the lug 17. In this regard, the soft casting material of the holder 2 and the reduced wall thickness of the end section 11 of the holder 2 assist in the penetration of the lug 17 into the holder material. It is also possible for the lug 17 and the depression 17' to be formed only when the holder 2 is pushed on, by the lug 17 being pressed out of the casing tube 1 and being embossed into the holder material. This also produces a form-fitting connection between the lug 17 and depression 17' in the axial direction. FIG. 5 illustrates, in a lateral longitudinal cross-sectional view, a top half of casing tube 1 and holder 2 of FIG. 1 with radially protruding lug 17 and depression 17'.

In order to produce the connection between an inner casing tube 1 and the holder 2, to which a spindle drive is fastened as an adjusting device for the casing tube 1, first of all the front stop 5 of the axially spaced apart, radially protruding stops is formed from the casing tube 1. The front stop 5 may be formed rapidly and reliably by internal high pressure by forming an encircling annular collar. The annular collar may alternatively also be produced with little complexity in the form of upset folds, by upsetting the casing tube 1.

Furthermore, the form-fitting element or the form-fitting elements is/are formed from the casing tube 1 in the manner of a dome-shaped knob 13, it being possible for the forming of the knob 13 to take place in a manner such that it is accurate in shape by internal high pressure. The knob may be formed by a tool which is pushed into the casing tube 1 and, in a simple manner, uses a punch to press the wall of the casing tube 1 radially outwardly locally. Knobs 13 as separate small components which are connected non-releasably to the casing tube 1 are also possible.

A mating form-fitting element 14 is formed on the holder 2 in a manner corresponding in shape, the element being configured as a depression which is negative in shape to the knob 13 or as a latching groove, as explained above. The depression or latching groove may be cast with little outlay together with the holder 2 or may be embossed into the firm holder material or may be milled out of the latter. In addition, the concentric, stepped widening 10 of the passage opening 8 of the holder 2 in the region of the end side 9 arranged in the push-on direction may be cast at the same time or turned.

Following the appropriate formation of casing tube 1 and holder 2, two different principles of procedure arise. The one sequence is based on the holder 2 first of all being pushed with its passage opening 8 onto the casing tube 1 until the stepped offset of the widening 10 of the passage opening 8 bears against the front stop 5, the holder 2 then being latched together with the casing tube 1 in the circumferential direction by a rotational movement of the casing tube 1 relative to the holder 2, and by the rear stop 7 finally being formed. This may make it easier for the holder 2 to be secured on the casing tube 1 for the formation of the rear stop 7, since, in the case of the mating form-fitting element 14 being configured as a depression, the all-sided latching obtained in the process already has the effect of a temporary locking which is difficult for installation movements to release. The rear stop 7 is configured with the effect that a section 19 of the casing tube 1, which section is spaced apart from the front stop 5 and adjoins the end side 12 of the holder 2, is expanded concentrically in a stepped manner by internal high pressure. The step of the concentric expansion forms the rear stop 7. The stepped expansion may also be realized by tumbling or indenting. By tumbling a bearing seat for a ball bearing for the mounting of the steering spindle may additionally be formed between the rear stop 7 and that end of the tube 1 which faces away from the holder 2 and is on the steering-wheel side. The expansion takes place in such a manner that the holder 2 is additionally pressed against the front stop 5, the step of the expansion being formed so close to the end side 12 of the holder 2 that the end side 12 of the holder 2, which side is used as a stop edge, is pressed in the push-on direction by the step of the expansion. As a result, the holder 2 is enclosed between the two axial stops 5 and 7 under prestress and is finally fixed in the axial direction on the casing tube 1 in a form-fitting manner.

In the case of the other procedure for installing the holder 2 on the casing tube 1, the holder 2 is first of all pushed onto the casing tube 1 until it bears against the front stop 5. Following this, the rear stop 7 is formed. However, the latter is configured in such a manner that, although the holder 2 is enclosed on the casing tube 1 by the stops 5 and 7, it is mounted in a stress-free manner, so that rotational movements of the holder 2 on the casing tube 1 are still permitted. In the case of holders 2 made of a material of low yield strength, this may be advantageous with regard to their durability. Finally, rotational movement causes the holder 2 to be latched together with the casing tube 1 in the circumferential direction. With this procedure, an axial fixing of the holder 2 on the casing tube 1 is already achieved at an early point, and so it may be insignificant whether the holder 2 has already taken up the desired position in the circumferential direction or has not. The position is then only reached by the final rotational movement of the holder 2. A complicated device for pressing the holder against the front stop 5 and simultaneously rotating the holder 2 in order to latch the form-fitting elements together with the mating form-fitting elements 14, as has to be provided in the first installation sequence, is rendered superfluous.

What is claimed is:

1. A connection, comprising:
   an inner casing tube of a steering column of a motor vehicle;
   a sleeve-shaped holder configured to be fastened to an adjusting device for the casing tube, the holder engaging around the casing tube in an encircling manner and fixed on the casing tube in a form-fitting manner; and
   wherein the casing tube includes at least two axially spaced apart, radially protruding stops against which, on oppositely facing sides, the holder is configured to bear with respective stop edges, the casing tube including at least one form-fitting element configured to interact in a latching manner in a circumferential direction with a mating form-fitting element arranged on the holder solely via movement of the entire holder relative to the casing tube from a first position with the form-fitting element on the holder away from the mating form-fitting element on the casing tube to a position over the form-fitting element on the casing tube, one of the stops of the casing tube including a stepped concentric widening of the casing tube.

2. The connection according to claim 1, wherein a front stop of the casing tube includes an encircling annular collar.

3. The connection according to claim 1, wherein the at least one form-fitting element includes a plurality of form-fitting elements formed on the casing tube and the holder includes a corresponding plurality of mating form-fitting elements distributed irregularly in the circumferential direction.

4. The connection according to claim 1, wherein the at least one form-fitting element includes a plurality of form fitting elements formed on the casing tube and the holder includes a corresponding plurality of mating form-fitting elements, the form-fitting elements offset with respect to one another in the circumferential direction and in an axial direction.

5. A connection comprising:
   an inner casing tube of a steering column of a motor vehicle; and
   a sleeve-shaped holder configured to be fastened to an adjusting device for the casing tube, the holder engaging around the casing tube in an encircling manner and fixed on the casing tube in a form-fitting manner;
   wherein the casing tube includes at least two axially spaced apart, radially protruding stops against which, on oppositely facing sides, the holder is configured to bear with respective stop edges, the casing tube including at least one form-fitting element configured to interact in a latching manner in a circumferential direction with a mating form-fitting element arranged on the holder, one of the stops of the casing tube including a stepped concentric widening of the casing tube;
   wherein the form-fitting element of the casing tube includes a dome-shaped knob and the mating form-fitting element of the holder includes a negative depression with a corresponding shape to the knob.

6. A connection, comprising:
   an inner casing tube of a steering column of a motor vehicle; and
   a sleeve-shaped holder configured to be fastened to an adjusting device for the casing tube, the holder engaging around the casing tube in an encircling manner and fixed on the casing tube in a form-fitting manner;
   wherein the casing tube includes at least two axially spaced apart, radially protruding stops against which, on oppositely facing sides, the holder is configured to bear with respective stop edges, the casing tube including at least one form-fitting element configured to interact in a latching manner in a circumferential direction with a mating form-fitting element arranged on the holder, one of the stops of the casing tube including a stepped concentric widening of the casing tube; and
   wherein the mating form-fitting element includes a latching groove extending axially on an inside of the holder and emerging from an end of the holder in a push-on direction, an end of the latching groove arranged between the form-fitting element of the casing tube and an opposite end of the holder in a pushed-on position of the holder.

7. A connection comprising:
   an inner casing tube of a steering column of a motor vehicle; and
   a sleeve-shaped holder configured to be fastened to an adjusting device for the casing tube, the holder engaging around the casing tube in an encircling manner and fixed on the casing tube in a form-fitting manner;
   wherein the casing tube includes at least two axially spaced apart, radially protruding stops against which, on oppositely facing sides, the holder is configured to bear with respective stop edges, the casing tube including at least one form-fitting element configured to interact in a latching manner in a circumferential direction with a mating form-fitting element arranged on the holder, one of the stops of the casing tube including a stepped concentric widening of the casing tube;
   wherein a passage opening of the holder is widened concentrically in a stepped manner in a region of an end of the holder arranged in a push-on direction, a stepped portion of the holder configured to bear against one of the stops of the casing tube arranged in the push-on direction.

8. A connection comprising:
an inner casing tube of a steering column of a motor vehicle; and
a sleeve-shaped holder configured to be fastened to an adjusting device for the casing tube, the holder engaging around the casing tube in an encircling manner and fixed on the casing tube in a form-fitting manner;
wherein the casing tube includes at least two axially spaced apart, radially protruding stops against which, on oppositely facing sides, the holder is configured to bear with respective stop edges, the casing tube including at least one form-fitting element configured to interact in a latching manner in a circumferential direction with a mating form-fitting element arranged on the holder, one of the stops of the casing tube including a stepped concentric widening of the casing tube;
wherein a passage opening of the holder is widened concentrically in a stepped manner in a region of an end of the holder arranged in a push-on direction, a stepped portion of the holder configured to bear against one of the stops of the casing tube arranged in the push-on direction; and
wherein the casing tube includes at least one radially outwardly protruding lug in a region of the stop of the casing tube that is arranged in the push-on direction, the lug forming the form-fitting element of the casing tube and engaging in a depression formed on an inside of the stepped portion.

9. A method for producing a connection between an inner casing tube of a steering column of a motor vehicle and a sleeve-shaped holder to which an adjusting device for the casing tube is fastened, comprising the steps of:
pushing the holder onto the casing tube;
forming a radially protruding front stop on the casing tube, the holder then pushed on until it bears against the front stop on the casing tube;
forming at least one form-fitting element on the casing tube;
forming a mating form-fitting element on the holder;
latching together the mating form-fitting element of the holder with the form-fitting element of the casing tube by movement of the casing tube relative to the holder in a circumferential direction; and
forming a rear stop on the casing tube so that the holder is enclosed between the front stop and the rear stop.

10. The method according to claim 9, wherein the front stop includes an encircling annular collar, the forming of the front stop including the substep of forming the encircling annular collar on the casing tube by internal high pressure.

11. The method according to claim 9, wherein the front stop includes an annular collar, the forming of the front stop including the substep of upsetting the casing tube to form the annular collar.

12. The method according to claim 9, wherein the rear stop forming step includes the substep of concentrically expanding a section of the casing tube spaced apart from the front stop in a stepped manner by internal high pressure.

13. The method according to claim 9, wherein the rear stop forming step includes the substep of concentrically expanding a section of the casing tube spaced apart from the front stop in a stepped manner by one of tumbling and indenting.

14. The method according to claim 12, wherein the concentrically expanding substep includes the further substep of pressing the holder against the front stop.

15. The method according to claim 13, wherein the concentrically expanding substep includes the further substep of pressing the holder against the front stop.

16. The method according to claim 9, further comprising the step of casting or turning a concentric, stepped widening of a passage opening of the holder in a region of an end arranged in a push-on direction, the holder pushed onto the casing tube until a stepped portion of the widening bears against the front stop of the casing tube which is arranged in the push-on direction.

17. The method according to claim 9, further comprising the step of forming at least one lug that protrudes radially outwardly and obliquely counter to a push-on direction on the casing tube in a region of the front stop of the casing tube, the form-fitting element of the casing tube including the lug, penetration of the lug into the holder during the pushing step causing formation of a depression, the depression including the mating form-fitting element.

18. The method according to claim 9, wherein the holder is first pushed onto the casing tube until bearing against the front stop, the holder then latched together with the casing tube in the circumferential direction by a rotational movement, and the rear stop then formed.

19. The method according to claim 9, wherein the holder is first pushed onto the casing tube until bearing against the front stop, the rear stop subsequently formed such that the holder is mounted on the casing tube in a stress-free manner, and the holder then latched together with the casing tube in the circumferential direction by a rotational movement.

20. A method for producing a connection between an inner casing tube of a steering column of a motor vehicle and a sleeve-shaped holder to which an adjusting device for the casing tube is fastened, comprising the steps of:
pushing the holder onto the casing tube;
forming a radially protruding front stop on the casing tube, the holder then pushed on until it bears against the front stop on the casing tube;
forming at least one form-fitting element on the casing tube;
forming a mating form-fitting element on the holder;
latching together the mating form-fitting element of the holder with the form-fitting element of the casing tube by movement of the casing tube relative to the holder in a circumferential direction; and
forming a rear stop on the casing tube so that the holder is enclosed between the front stop and the rear stop;
wherein the form-fitting element of the casing tube includes a dome-shaped knob and the mating form-fitting element of the holder includes one of a negative depression with a corresponding shape to the knob and a latching groove that extends axially on an inside of the holder and emerges from an end of the holder arranged in a push-on direction, an end of one of the negative depression and latching groove arranged between the form-fitting element of the casing tube and an opposite end of the holder in a pushed-on position of the holder.

21. The method according to claim 20, wherein the step of forming the form-fitting element on the casing tube includes the substep of forming the knob by internal high pressure.

22. The method according to claim 20, wherein the step of forming the form-fitting element on the casing tube includes the substep of forming the knob by pressing a wall radially outwardly locally.

23. The method according to claim 20, wherein the holder is cast, the mating form-fitting element forming step including the substep of casting the one of the depression and the latching groove at a same time as casting the holder.

24. The method according to claim 20, wherein the mating form-fitting element forming step includes the substep of embossing the one of the depression and the latching groove in the holder.

25. The method according to claim 20, wherein the mating form-fitting element forming step includes the substep of milling the one of the depression and the latching groove out of the holder.

* * * * *